United States Patent [19]

Depeault

[11] Patent Number: 4,594,006
[45] Date of Patent: Jun. 10, 1986

[54] APPARATUS FOR MIXING AND PUMPING SLURRY

[76] Inventor: Marcel Depeault, 1337 rue Principale, St-Valérien, Co Shefford, Québec, Canada, J0H 2B0

[21] Appl. No.: 571,672

[22] Filed: Jan. 17, 1984

[51] Int. Cl.⁴ .............................................. B01F 5/12
[52] U.S. Cl. ..................... 366/266; 366/190; 366/285; 417/231; 417/900
[58] Field of Search ............... 366/244, 245, 246, 247, 366/248, 249, 250, 251, 254, 261, 263, 264, 265, 266, 279, 285, 286, 290, 291, 295, 305, 318, 329, 331, 136, 137, 190; 384/400, 474, 477, 484, 519; 415/62, 143; 417/231, 440, 900

[56] References Cited

U.S. PATENT DOCUMENTS

| | | | |
|---|---|---|---|
| 1,233,624 | 7/1917 | Wallace | 384/400 |
| 1,879,927 | 9/1932 | Eakins | 366/249 |
| 3,367,583 | 2/1968 | Kellogg . | |
| 3,905,725 | 9/1975 | Johnson | 366/263 |
| 3,948,450 | 4/1976 | Erlitz . | |
| 4,284,371 | 8/1981 | Paulson et al. . | |
| 4,416,549 | 11/1983 | Kietschmer | 366/264 |
| 4,432,869 | 2/1984 | Groeneweg et al. . | |
| 4,441,824 | 4/1984 | Brokaw | 366/266 |

FOREIGN PATENT DOCUMENTS

1101839 5/1981 Canada .

Primary Examiner—Robert W. Jenkins
Attorney, Agent, or Firm—Swabey, Mitchell, Houle, Marcoux & Sher

[57] ABSTRACT

An apparatus for mixing and pumping manure from a reservoir including an elongated frame adapted to be pivoted from a vehicle bed from a lying position to an upright position within a reservoir to be pumped. Pump means are provided at the base of said elongated frame communicating with a conduit extending the length of the frame, a first slurry mixing impeller adjacent the pump at the base of the frame and driven by a common shaft with the pump, a second mixing means in the form of a screw having an axis of rotation parallel to the elongated frame and having a common drive shaft with the impeller and the pump and a third mixing device in the form of a jet nozzle communicating with the pump at the base thereof and being spaced from the second mixing means. The first and third mixing means have jet nozzles directed at right angles to the axis of the elongated frame.

16 Claims, 12 Drawing Figures

APPARATUS FOR MIXING AND PUMPING SLURRY

BACKGROUND OF THE INVENTION

1. Field of the Invention

The present invention relates to an apparatus for mixing and pumping slurry such as animal manure and more particularly to a portable device for temporarily using such apparatus in a reservoir such as an open pit or the like containing such manure.

2. Description of the Prior Art

Farm animal manure is a slurry containing liquids and solids in suspension. Such manure must be held in holding reservoirs near a barn such as in-the-ground tanks or lagoons. A by product of keeping animal manure is that it can, when required, be spread by suitable spreaders on fields as a fertilizer. The apparatus for spreading the manure normally comprises a closed tank mounted on a vehicle and communicating with a spreader. When required, the manure in the holding reservoir must be transferred into the spreading tanks by suitable pumps.

However, the manure in the holding reservoir tends to separate and the solids may settle to form a thick layer at the bottom of the reservoir and may also form a thick solid crust on the surface of the liquids. Such crust has a consistency of dry peat moss and must therefore be broken up before it can be mixed with the liquid into a slurry and be transferred from the reservoir into the spreading apparatus. It is necessary, therefore, to provide an apparatus for both mixing the solids and forming a slurry with the liquids in the reservoir as well as to have a pumping apparatus for pumping the so-formed slurry into the tank for the spreading apparatus.

Canadian Pat. No. 1,126,257 issued June 22, 1982, describes a proposed solution to the problem by providing a combined slurry mixing device and pump for the purpose of transferring the slurry to some other holding means such as a tank on a spreading apparatus.

There are other patents which describe generally devices for mixing manure in reservoirs for forming a slurry and then pumping the slurry. One of the problems which still exist even in the light of the solutions mentioned above, is the breaking up and mixing of the top crust. The top crust in the reservoir is mostly cow manure. This upper or floating crust can become relatively hard and can reach six feet in thickness. It causes a problem from a mixing point of view since as shown in Canadian Pat. No. 1,126,257, the mixing devices are normally provided at the bottom of the apparatus and near the bottom of the reservoir. In the case of the above mentioned Canadian patent, a nozzle is provided for diverting recirculated slurry as a jet towards the upper crust to try and break the crust. However, it has been found with conventional mixing devices including the above mentioned Canadian patent, that the breaking up of the upper crust and the mixing thereof is very time consuming and therefore, can be costly.

SUMMARY OF THE INVENTION

It is an aim of the present invention to provide an improved apparatus for mixing the slurry and for pumping the mixed slurry from a reservoir which is particularly efficient in the breaking up and mixing of the floating crust as well as the sediments at the bottom of the tank.

It is also an aim of the present invention to maintain the gear case on a portion of the apparatus which is never submerged in the reservoir in order to avoid undue corrosion of such parts.

It is a further aim of the present invention to provide a separate mixing impeller and pump impeller driven by the same shaft thereby reducing the number of parts required as well as the cost of manufacture and maintenance of the equipment.

It is a further aim of the present invention to provide an improved vehicle mounting arrangement for mounting the apparatus for portability on the vehicle and for swinging the apparatus into an operative vertical position within a typical holding reservoir.

An apparatus in accordance with the present invention comprises an elongated frame adapted to be mounted on a vehicle and carried in a horizontal mode. Means are provided for pivoting the frame into a substantially vertical operative position within a slurry holding reservoir. The frame mounts, when in a vertical mode, at least a pump means at the bottom of said frame and slurry conduit means communicating with the pump and extending upwardly on the frame to the top of the frame for connection with delivery means. A first slurry mixing means is provided at the bottom of the frame having a generally horizontal component. A second slurry mixing means is provided on the frame and has a vertical component in a direction to move the slurry being mixed from an upper portion of the frame towards a lower portion of the frame. Means are provided for driving the pump means and the first and second mixing means.

In a more specific embodiment of the invention, there is provided a third mixing means having a horizontal component in an upper portion of the frame and adapted to be submerged in the slurry during operation. Still further, the second mixing means would be in the form of a screw-type pump including a spiral blade adapted, when the shaft is rotated in a first direction, to cause a downward flow of the slurry from the top of the frame towards the bottom of the frame.

In a still more specific embodiment of the present invention, the drive means includes a gear box at the top of the frame to which is connected a drive shaft which extends longitudinally of the frame and is operatively connected to the pump means for driving the pump, and to a separate impeller for driving the first mixing means. The screw-type pump is fixedly mounted onto the drive shaft.

As will be evident from this disclosure, the screw-type pump which extends from the top of the slurry in the holding reservoir to the bottom thereof, creates a downward moving flow which draws pieces of the crust downwardly and which recirculates by means of the first mixing means provided at the bottom of the reservoir. With the third mixing means in the form of a net nozzle through which slurry is recirculated, the upper crust will be further broken up by this net nozzle and as pieces are broken from the crust, they will immediately be drawn into the downward flow of the slurry caused by the spiral pump.

Once the slurry has been completely mixed, the slurry is pumped from the bottom of the frame upwardly through the slurry conduit to communicate with a transfer device.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
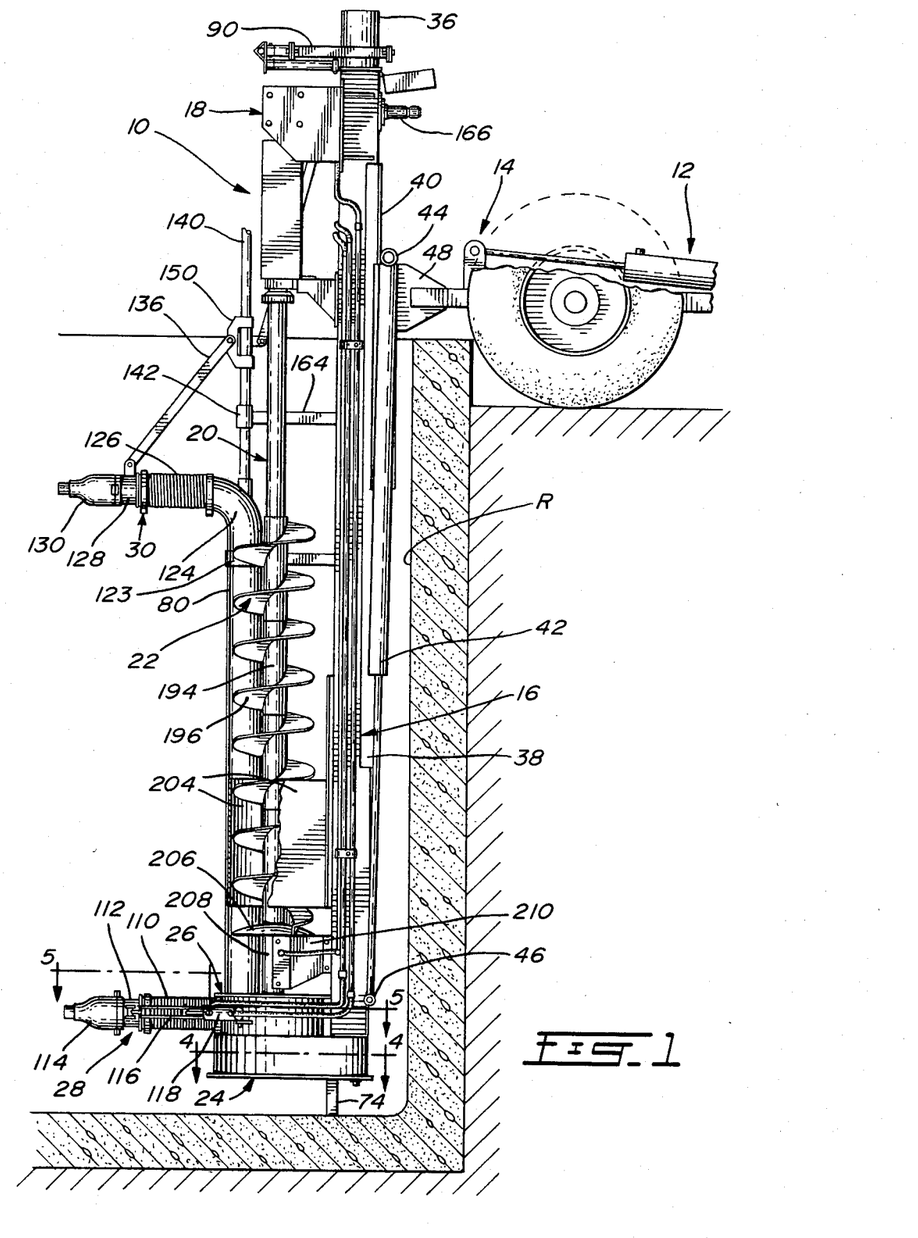
FIG. 1 is a side elevation of the apparatus in a vertical mode within a holding tank.

Reference will now be made to the drawings and particularly FIG. 1 which shows the mixing and pumping apparatus 10 in an upright position within a reservoir R. The apparatus 10 is mounted on a vehicle 12 shown in this drawing. The apparatus can be pivoted onto the vehicle by means of the linkage and mounting bracket 14 as will be described later.

The mixing and pumping apparatus 10 which will be described in its upright position, includes a frame 16 to which is mounted a gear case 18 at the top thereof, a drive shaft 20 on which is provided a pumping screw 22. At the bottom of the frame 16 is a pair of impeller assemblies 24 and 26. The two impellers are mounted to the same drive shaft 20 and a first agitator jet nozzle 28 communicates with the outlet port of impeller 26 while the agitator jet nozzle 30 communicates with the outlet of impeller 24.

Figures 9, 10:
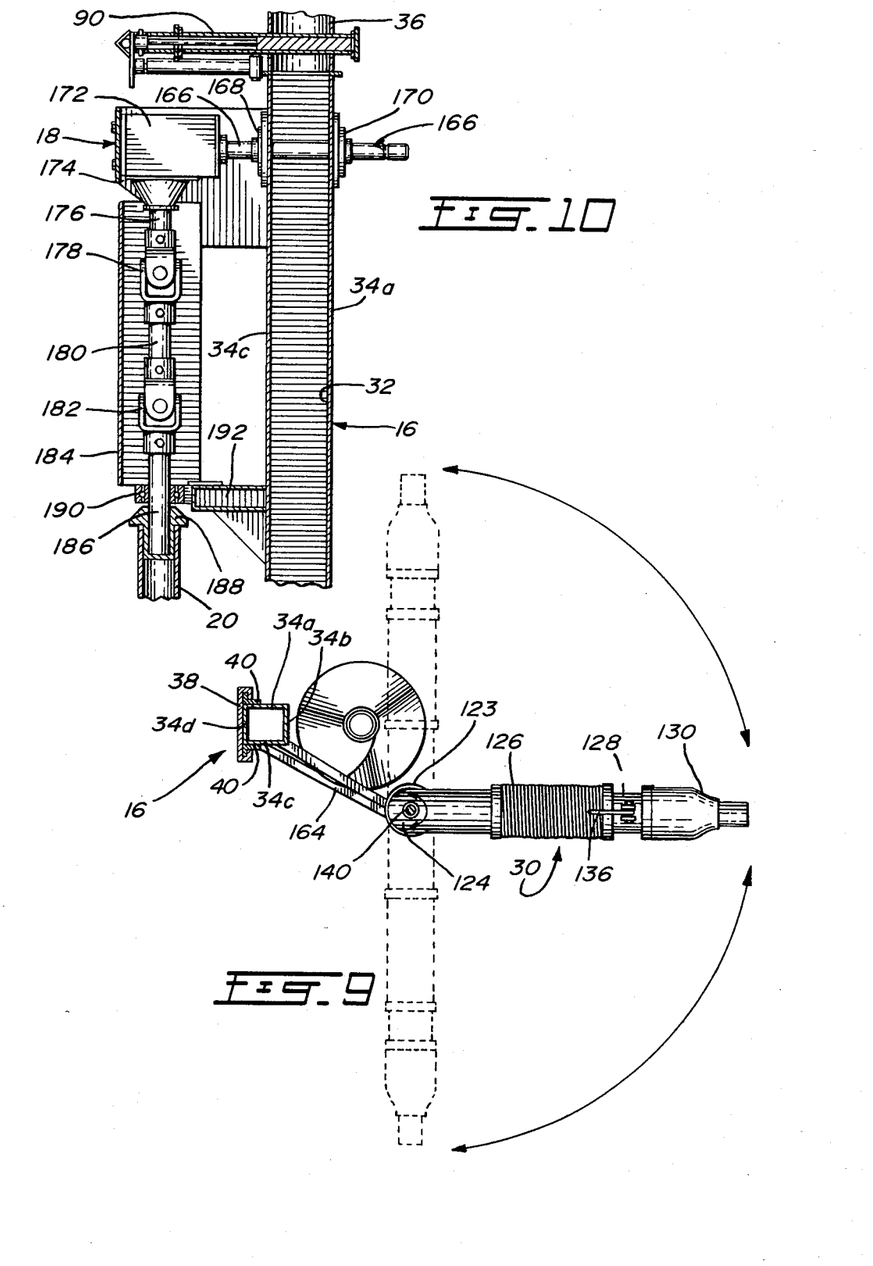
FIG. 9 is a horizontal plan partly in cross-section taken along lines 9—9 of FIG. 8.
FIG. 10 is a fragmentary vertical cross-section of a further detail of the apparatus at the top of the frame thereof.

The frame 16, as seen in FIGS. 2, 5, 9 and 10, is in the form of a hollow box-shaped tube made of structural steel forming walls 34a, 34b, 34c and 34d. These walls define a conduit 32 communicating with the discharge of impeller assembly 24. At the upper end of the frame 16, as shown in FIG. 10 for instance, the conduit 32 communicates with a delivery discharge port 36 which in this case is in the form of a circular cylinder to which transfer means can be connected such as flexible pipe which would communicate with a closed tank on a spreader type vehicle.

The frame 16 has welded thereto a pair of angles forming flanges 40 which enables the frame 16 to slide in a track 38. The track 38 is fixedly mounted to a bracket 48 on the vehicle while a piston and cylinder 42 is connected at one end by means of hinge pin 44 to the mounting bracket 48 and at the other end to a hinge pin 46 on the frame 16 near the bottom thereof. Thus, the frane 16 and therefore the apparatus 10 can be adjusted vertically depending on the depth of the reservoir R to be emptied, by activating the piston and cylinder arrangement 42. The piston and cylinder arrangement 42 merely moves the frame 16 relative to the track 38.

Figure 4:
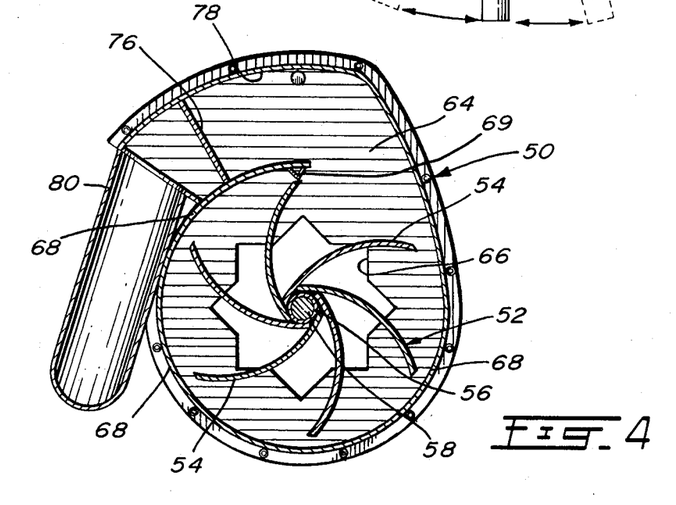
FIG. 4 is a horizontal cross-section taken along lines 4—4 of FIG. 1.

The impeller assembly 24 includes a casing 50 surrounding an impeller rotor 52 comprising a sleeve 56 with blades 54. The shape of the impeller rotor 52 is illustrated in FIG. 4. The impeller rotor sleeve 56 is fixedly mounted to a shaft 58 of drive shaft 20 and is fixedly connected thereto by means of key 60 provided in a suitable keyway. The impeller 52 can be removed by removing a nut 62 on the end of the shaft 58.

The casing 50 includes a bottom wall 64 having an opening 66. The opening 66 has a particular form as seen in FIG. 4 which is not unlike the outline of the star of David. The purpose of providing such an outline to the opening 66 is to allow better attack angles for the shearing action required between the impeller blades 54 and the bottom wall 64 in order to further break apart chunks of solid material which may be entering the impeller casing through the bottom wall 64.

The casing 50 also includes a shroud 68 having a circular outline near the edges of the impeller blades 54 which curves out into a diffuser 78 in the area of the casing communicating with the conduit 32. The diffuser 78 of the lower impeller assembly 24 is also illustrated in the cross-section shown in FIG. 5. A further shearing rib 69 can also be provided on the shroud 68 which leaves a very close clearance with the tips of the blades 54 for further shearing action on the slurry being formed.

The casing 50 has an upper wall in the form of a median wall 70 defining a small opening 72 allowing the shaft 58 to pass therethrough as well as the sleeve 56 which may be in two parts, such as 56 and 57.

Figure 3:
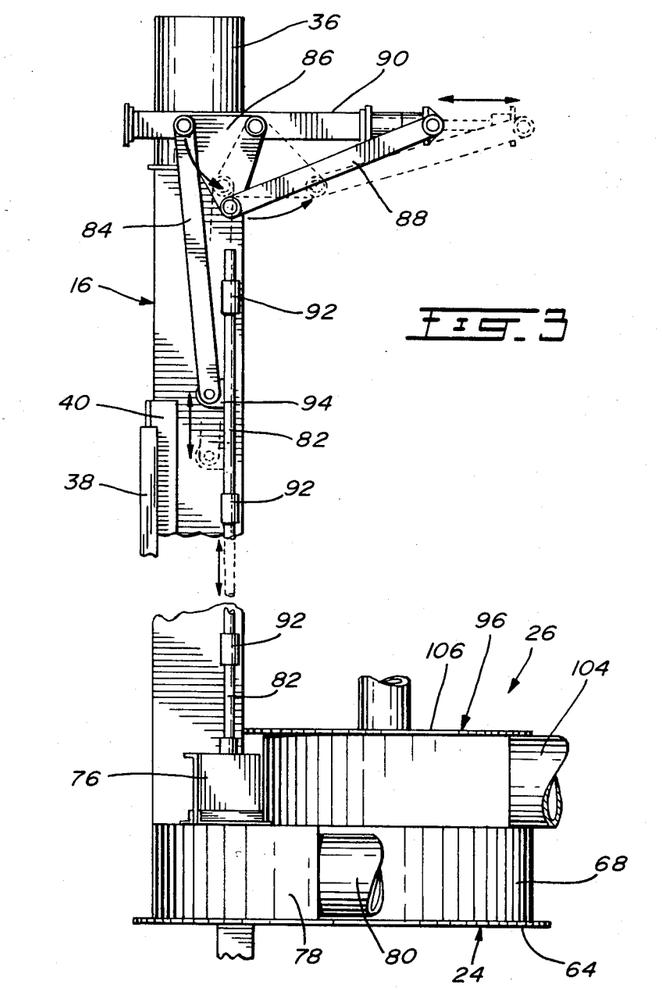
FIG. 3 is an enlarged fragmentary side elevation showing a further detail of the apparatus.

The casing 50 has a further exit port communicating with the slurry conduit 80 which, as shown in FIGS. 1 and 9, communicates with the agitatorjet nozzle 30. A gate valve 76 operates in a guillotine fashion, and is connected to the end of rod 82 as seen in FIG. 3 and is adapted to close off the flow of the discharge from the impeller 52 to the conduit 80 thereby diverting the flow up through the conduit 32 through the discharge port 36. When the gate valve 76 is in an open position, as shown in FIG. 3, the discharge from the impeller rotor 52 will be directed through to the conduit 80 and out the agitator jet nozzle 30.

Gate valve 76 as shown in FIG. 3, is operated by means of a piston and cylinder arrangement 90 to which a lever 88 is connected at one end thereof. The other end of the lever 88 is pivotally connected to a triangular lever plate 86. One corner of the triangle is fixed to the frame while a link 84 is attached at one end to the third corner of the triangular lever plate 86 and at the other end it is attached to a bracket 94 on rod 82. When the hydraulic piston and cylinder arrangement 90 is extended, the lever 88 will rotate the triangular plate 86 in a clockwise direction which will move the lever 84 in an upward direction thereby drawing on the rod 82 which will lift the gate valve 76 allowing communication from the diffuser 78 through to the agitator conduit 80. When the piston and cylinder arrangement 90 is retracted, as shown in full lines in FIG. 3, the gate valve 76 is in its uppermost position. When the piston and cylinder arrangement 90 is in its fully extended position as shown in dotted lines in FIG. 3, the gate valve 76 is in its extreme downward position closing off communication between the diffuser 78 and the conduit 80, thereby diverting all of the flow from the impeller upwardly through the conduit 32 to be discharged through the discharge port 36.

The casing 96 of the impeller assembly 26 includes a top wall 106, a shroud 102 and an opening 108 defined in the top wall 106. Within the casing 96, there is provided an impeller 98 with blades 100, the impeller chamber formed by the casing 96 communicates directly with discharge port 104 to which is connected the agitator nozzle 28 as will be described further.

Figure 5:
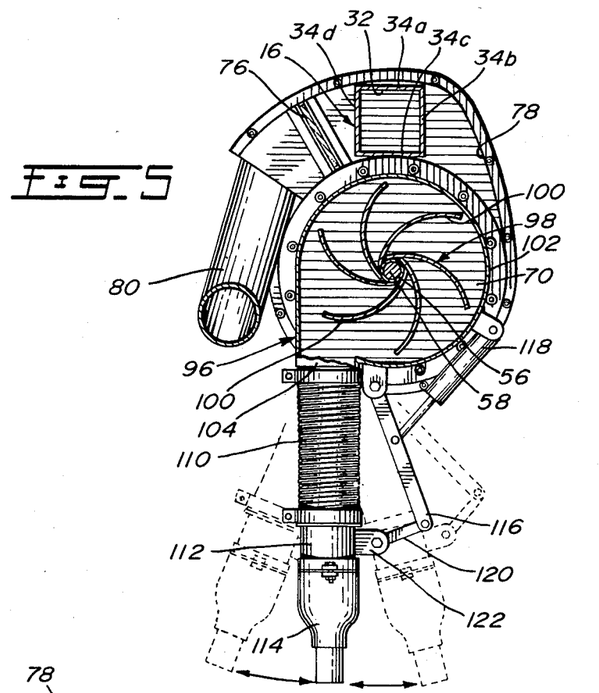
FIG. 5 is a horizontal cross-section taken along lines 5—5 of FIG. 1.

As shown in FIG. 5, the impeller 90 includes a sleeve 57 keyed to the shaft 58 with key 60, the same key which cooperates with sleeve 56. Impeller 98 is thus rotated in unison with the impeller 52. Impeller 98 includes impeller blades 100. As the shaft 58 is rotated, the discharge from the impeller will be continuously passed through the port 104 and thus through agitator 28.

The slurry enters the impeller casing 96 through the central opening 108 and is immediately pumped through the agitator nozzle 28 in order to create circulation and mixing of the slurry in the bottom portion of the reservoir R.

Nozzle 28 includes a flexible pipe 110 made of suitable material such as a corrugated rubber or synthetic material to which is attached an adapter neck 112 mounting the nozzle 114. The outlet of the nozzle 114 as shown in FIGS. 1 and 5 is considerably smaller in diameter than the passage defined by the flexible pipe 110 and the neck 112 to thereby create a jet.

The direction of the jet can be controlled by varying the direction of the nozzle 114 as shown in FIG. 5 in dotted lines. Piston and cylinder arrangement 118 which is mounted on the casing wall 102 is connected to a lever 116 which in turn is pivoted to a link 120 which is pivoted to a bracket 122 on the neck 112. By actuating the piston and cylinder arrangement 118, lever 116 will be displaced thereby displacing the link 120 and thus the nozzle 114 through an arc of roughly 20 to 30 degrees in the horizontal plane. Control of the piston and cylinder arrangement will be at the top of the frame 16 (not shown). The fulid to the piston and cylinder 118 will be through conduits provided on the frame 16 as shown in FIG. 1.

A further agitator nozzle 30 is located above the agitator nozzle 28 and at the top of the elongated conduit 80. An elbow 124 sitting in a bearing type collar 132 is bent 90 degrees such that the direction of the agitator nozzle 30 will be somewhat parallel to agitator nozzle 28 but spaced thereabove. The agitator nozzle 30 includes a flexible pipe section 126 to which an adapter neck 128 is fixed. A nozzle 130 having a restricted diameter outlet is connected to the neck 128 for the purpose of forming a pressure jet of the slurry mixture being forced up through the conduit 80 through the agitator nozzle 30. The jet so formed breaks up and mixes the crust formed at the top of the slurry and the reservoir R.

Figure 8:
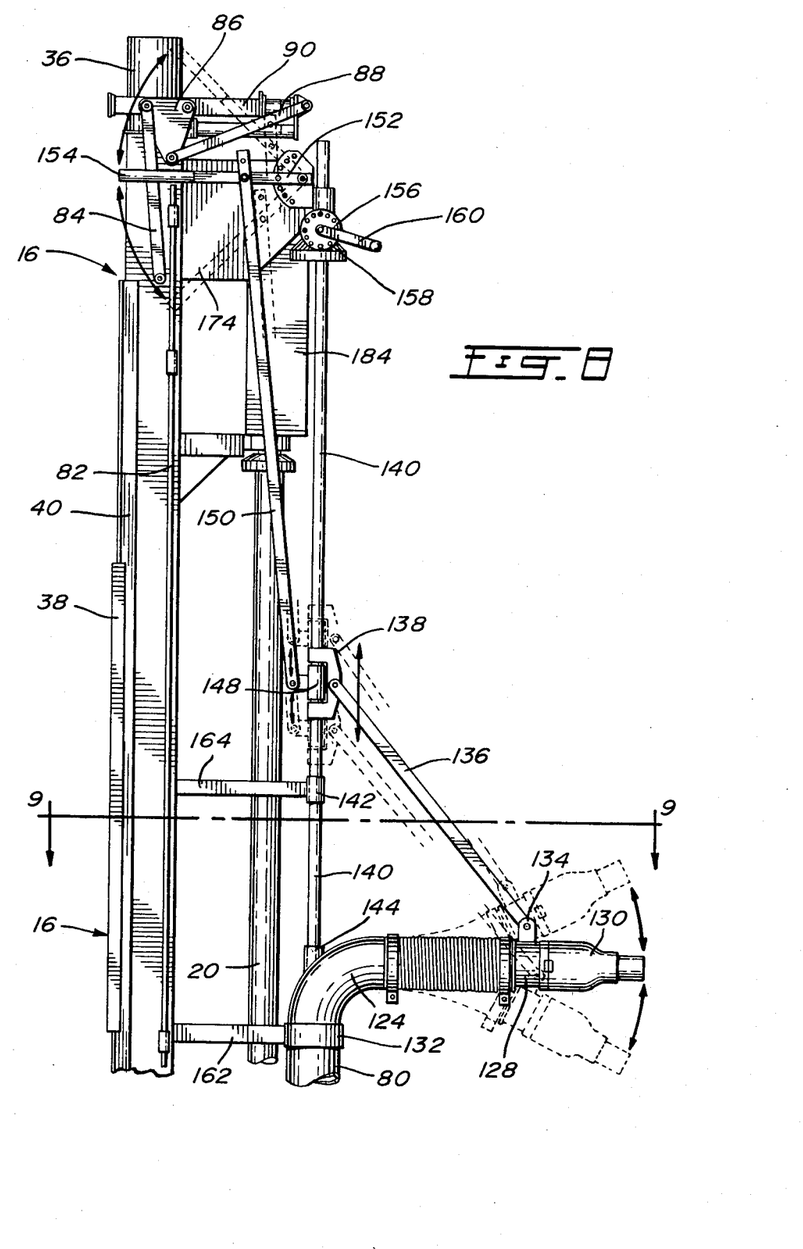
FIG. 8 is an enlarged side elevation of the upper part of the frame of the apparatus shown in FIG. 1.

The nozzle 30 may be moved through an arc in a horizontal plane as determined by a rod 140 which is fixed to the elbow 124 by means of the joint 144. Rod 140 as shown in FIG. 8, is held in journal 142 mounted to support arms 164 and the top thereof has a bevel gear 158 which is fixed thereto. A similar bevel gear 156 with a swivel handle 160 is provided for the purpose of rotating the rod 140 and thereby the elbow 124. This control by way of the bevel gears 156 and 158 will cause the agitator nozzle 30 to travel through an arc of 180 degrees as shown in FIG. 9.

The agitator nozzle 30 may also travel through an arc in a vertical plane in the light of the flexible pipe 126 and the linkage illustrated by means of link 136 pivoted to bracket 134 on the neck 128. The other end of the ink 136 is connected to a bracket 138 which is journaled on the rod 140.

A sleeve 148 is also journaled on the rod 140 contained within the U-shape bracket 138. The sleeve 148 is connected to link 150 which in turn is mounted to a lever 152 including a handle 154. It can be seen that the nozzle 130 can be moved through by moving the lever 152 thus actuating links 150 and 136. Thus, the rod 140 serves both for swiveling the agitator nozzle through horizontal plane and also supports the linkage mechanism to allow the agitator nozzle 30 to move through an arc of roughly 30 degrees in the vertical plane.

It is evident that other mechanisms could replace the mechanisms for moving the agitator nozzles through their horizontal or vertical arcs. For instance, such mechanisms could be replaced by hydraulic or pneumatic devices. These mechanisms are illustrated here by way of examples only.

Reference will now be made to FIGS. 1, 2, 6, 7 and 10. A transmission shaft 166 is provided at the top of the frame 16 and passes through the frame 16, that is through the conduit 32 and is held by journals 168 and 170 which also act as seals to prevent the slurry within the conduit 32 from seeping out the openings formed for the passage of the shaft 166. Transmission shaft 166 is connected to a gear box 172 and mounted in a gear case cover 174 which in turn is fixed to the frame 16. The output of the gear case 172 is a stub shaft 176 connected to the universal gear 178 which in turn is connected to a stub shaft 180 connected to a universal gear 182. The universal gear 182 is connected to a shaft 186 which in turn is keyed to a collar shaped socket 188.

A cover 184 surrounds the universsl joints 178, 182 as shown in FIG. 10 and is mounted to a support bracket 192 fixed to the frame 16. The support bracket 192 also mounts a ball-bearing 190 through which passes a shaft 186.

Figures 6, 7:
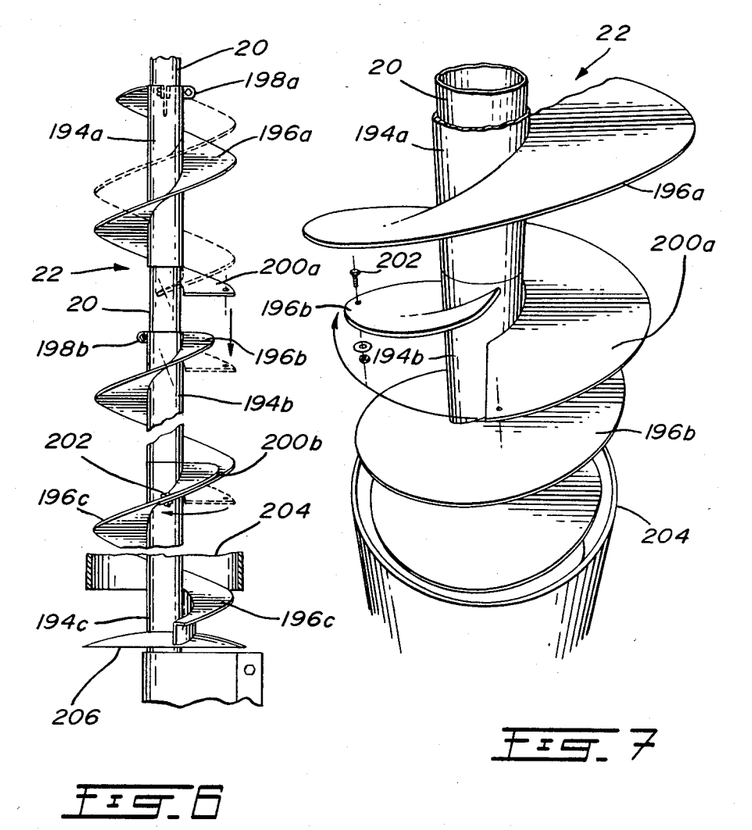
FIG. 6 is a fragmentary elevation of the detail of the apparatus shown in FIG. 1.
FIG. 7 is a fragmentary perspective view of this detail shown in FIG. 6.

Drive shaft 20 is in the form of a cylindrical tube fixedly connected to the socket 188. As shown in FIGS. 1, 6 and 7, screw pump sections 22 are provided with each section 22 including a sleeve 194, a spiral blade 196 having an extension 200, extending beyond the bottom extremity of the sleeve 194. Each sleeve 194 includes a tightening bracket 198 fixing the sleeve 194 to the drive shaft 20.

In FIGS. 6 and 7, these various screw sections are shown, with each section having succeeding subscripts. The uppermost section 22 includes sleeve 194a having a screw 196a with an extension 200a. As shown in FIG. 7, when the sections are mounted on the shaft 20, the downward extension 200a, overlaps with the upper part of the spiral blade 196b of the downwardly succeeding section including sleeve 194b. A screw and nut 202 pass through apertures provided in the spiral blade 196b and extension 200a to fix two succeeding sections together.

Figure 2:
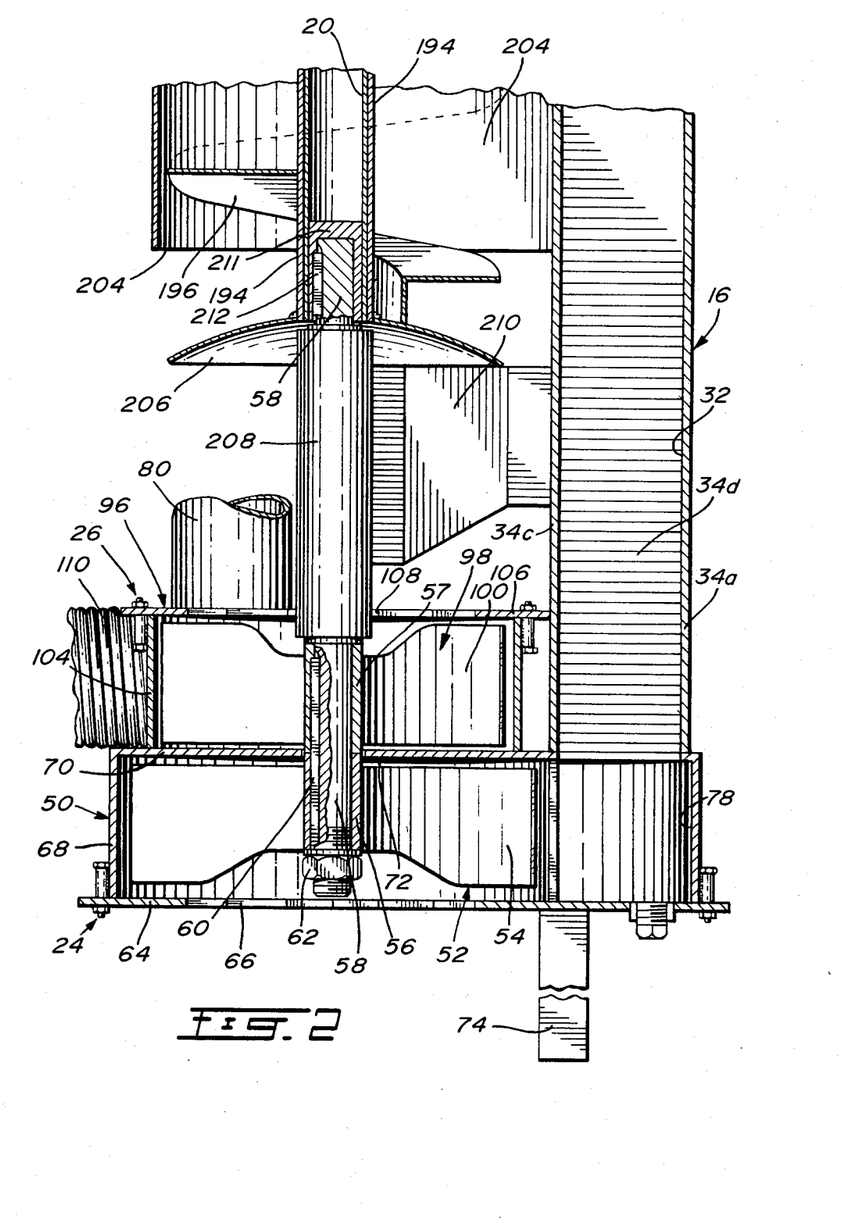
FIG. 2 is an enlarged fragmentary vertical cross-section of a detail of the bottom of the apparatus shown in FIG. 1.

As shown in FIGS. 1, 2 and 7, a tubular shroud 204 surrounds the bottom portion of the pump screw 22. The shroud provides a narrowed tolerance between the outer edges of the spiral blade 196 and the inner surface of the shroud 204.

At the bottom end of the pump screw 22 is a dome shaped disc 206.

As shown in FIG. 2, the bottom of the shaft 20 includes an insert 211 as seen in the upper end of the shaft 58 keyed to the insert 211 by means of a key 212 provided in respect of two keyways. The shaft 58 is supported by means of sealed self-adjusting bearings provided in a hermetically sealed bearing housing 208 supported to the frame 216 by means of bearing support 210. The housing 208 is sealed from the slurry and contains a supply of oil which is continuously fed by means of an oil conduit extending upward on the frame 16 to a suitable oil supply.

It can be seen that rotation of the transmission shaft 166 will cause the drive shaft 20 to rotate thereby rotating the pump screw 22, the dome shape disc 206, the impeller 52 and the impeller 98. As the shaft 20 is rotated, the pump screw 22 will force a vertically downward flow of fluid entraining crust sections and causing the crust to break up at the surface of the slurry in the vicinity of the apparatus 10. Further, crust being broken up by the agitator nozzle 30 will also be drawn downwardly in this flow caused by the pump screw 22. The pump screw 22 will draw the pieces of crust through the tubular shroud 204 further causing the breakup of the crust pieces. The smaller particles will then be diverted by the dome shape disc 206 and drawn into the impeller 98 as well as the impeller 52 through the respective openings 108 and 66.

Depending on the position of the valve gate 76, the slurry can be passed through the slurry conduit 80, through the agitator nozzle 30 or pumped through the passage 32 in the frame 16. However, in the initial mixing stage, a valve gate 76 will normally be closed thereby causing the slurry drawn into the impeller 52 to exit through the nozzle 130. Of course, all of the slurry entering into the impeller 98 will exit through the nozzle 114 causing further convection flow of the slurry. It has been found through experiments, that the agitation by means of the nozzles 28 and 30, in particular the downward flow caused by the pump screw 22, will greatly enhance the mixing of the slurry and shorten the time necessary for complete mixing thereof allowing the mixture or slurry to be pumped from the reservoir R much more quickly.

Figure 11:
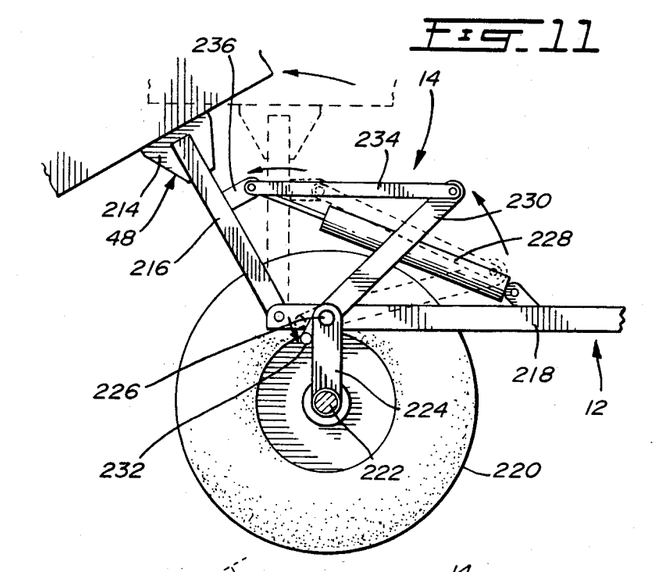
FIG. 11 is a side elevation of a typical mounting arrangement for the apparatus shown in FIG. 1.
Figure 12:
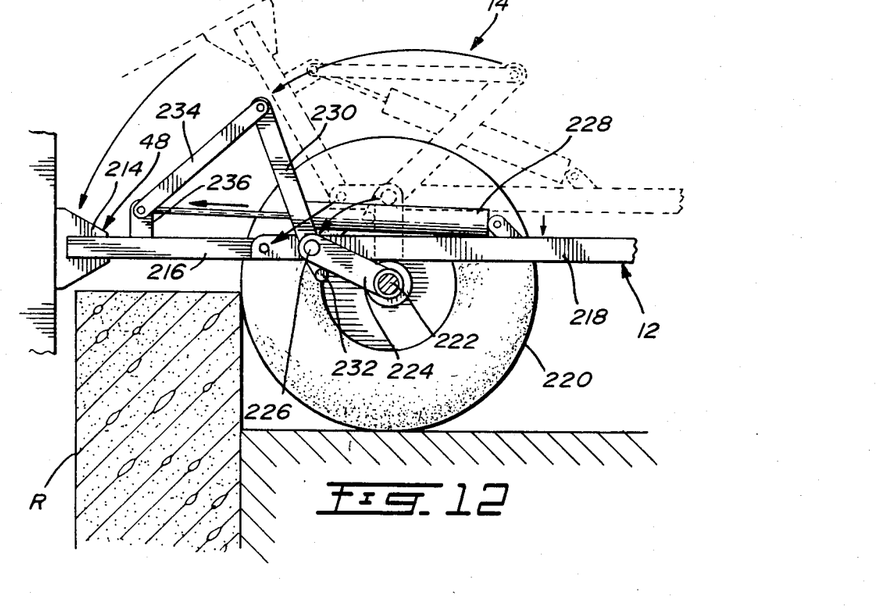
FIG. 12 is a view similar to FIG. 11 showing the mounting apparatus in a different operative position.

The frame 16 can be mounted on any vehicle, however in the present case, a special trailer vehicle is provided with a vertically adjustble bed 218 as shown in FIGS. 11 and 12. Pivoted through the bed 218 is a lever 216 to which is mounted a mounting bracket 214.

Wheels 220 are mounted to a shaft 222 which is fixed to levers 224. The other end of the levers 224 are connected to hinge pins 226 mounted to the bed 218 and to which a lever 230 is pivoted. Lever 230 also includes a stopper 232 to prevent the lever 230 from moving beyond a predetermined obtuse angle as shown in the drawings. Link 234 is pivotally mounted at the other end of lever 230 and is connected at its other end to the bracket 230 mounted to lever 216. A piston and cylinder arrangement 228 is connected at one end to the vehicle bed 218 and at the other end to the bracket 236.

Retraction of the piston and cylinder arrangement 228 will cause the frame 16 to be swung onto the vehicle bed as shown in FIG. 11 and at the same time causing the vehicle bed 218 to rise from the ground since the lever 224 is forced in a vertical position. Extension of the piston and cyinder arrangement 228 moves the lever 216 clockwise and the wheels 220 are caused to pivot upwardly towards the bed 218 as shown in FIG. 12.

I claim:

1. An apparatus for mixing and pumping a slurry from a reservoir including an elongated frame adapted to be placed vertically in the reservoir, a first pump means having an inlet at the bottom of said frame adapted to be near the bottom of the reservoir and the first pump means having a discharge, and slurry conduit means communicating with the discharge of said first pump means and extending upwardly on the frame for communication with one of a delivery means and a first nozzle type agitator, an elongated pump screw provided on the frame and driven to provide a vertical thrust to the slurry in the vicinity of the frame in a direction to move the slurry being mixed from an upper region of the reservoir relative to the frame towards a lower region of the reservoir relative to the frame, and means for driving the first pump means and the elongated pump screw.

2. An apparatus as defined in claim 1, wherein the pump screw is mounted on a drive shaft having an axis parallel to the axis of the frame.

3. An apparatus as defined in claim 2, wherein the pump screw is in the form of a continuous spiral blade and a tubular shroud surrounds the lower portion of the extent of the spiral blade, such as to break larger solid pieces in the slurry as the slurry is moved downwardly by the pump screw.

4. An apparatus as defined in claim 2, wherein the pump screw is in the form of a continuous spiral blade made up of detachable sections including sleeves on which a detachable section of spiral blade is fixed, the sleeves being adapted to be mounted and fixed to the drive shaft.

5. An apparatus as defined in claim 2, wherein the drive shaft is supported on a bearing mounted near the bottom of the frame and is connected at the top of the frame to a gear case.

6. An apparatus as defined in claim 5, wherein a bearing is in the form of adjustable bearings in the sealed housing and lubrication fluid is supplied to the sealed housing from a reservoir remote from the frame.

7. An apparatus as defined in claim 1, wherein the first pump means includes an impeller, the impeller having an axis of rotation parallel to the axis of the frame, a casing surrounding the impeller, the frame including an elongated structural hollow tube forming a conduit for the slurry, the conduit formed in the frame communicating with the discharge of the impeller of the pump such that slurry can be pumped through the conduit along the entire extent of the frame to be discharged at the other end of the frame.

8. An apparatus as defined in claim 1, wherein the frame is in the form of an elongated structural member and a track, the elongated structural member having means adapted to slide in said track and means provided for extending and retracting said elongated structural means relative to said track.

9. An apparatus for mixing and pumping slurry from a reservoir as defined in claim 8, the frame being adapted to be carried by a vehicle with the frame extending in a general horizontal position, mounting means provided on the vehicle and connected to said track of the frame, actuating means between the track and the elongated structural member for retracting and extending the structural member relative to said track, actuating means between said vehicle and said mounting means for pivoting the frame from the horizontal position to a vertical position with the bottom of the frame within the reservoir.

10. An apparatus as defined in claim 1, wherein a second pump means is provided coaxially and adjacent the first pump means at the bottom of the frame, the second pump means having an inlet facing and coaxial with the pump screw and the second pump means having a discharge in the form of a second nozzle type agitator providing a horizontal thrust to said slurry at the bottom of said frame.

11. An apparatus as defined in claim 10, wherein the second pump means is in the form of an impeller having an axis of rotation parallel to the axis of the frame, a casing surrounding the impeller and including an inlet port and a discharge port, the discharge port being tangentional to the impeller and a jet forming nozzle communicating with the discharge port and directing at right angle to the axis of the frame.

12. An apparatus as defined in claim 11, wherein the impeller of the second pump means is mounted to the drive shaft mounting the pump screw of the pump screw means for rotating the impeller and the pump screw in unison, said second pump means being in the form of an impeller in a separate casing at the bottom of the frame and having an axis coaxial with the axis of the impeller in the second pump means, the impeller of the first pump means being mounted on the same shaft as the impeller of the second pump means such that when the drive shaft is rotated the impeller of the second pump means and the impeller of the first pump means rotate in unison.

13. An apparatus as defined in claim 12, wherein valve means are associated with the discharge of the impeller in the casing of the first pump means to alternately direct the discharge slurry through a first conduit of the slurry conduit means through to the first nozzle type agitator in one valve position and through a second conduit to the delivery means in the other valve position for pumping the slurry from the reservoir.

14. An apparatus as defined in claim 11, wherein means are provided for moving the direction of the jet nozzle of the second pump means through an arc in a plane perpendicular to the axis of the frame.

15. An apparatus as defined in 1, wherein the first nozzle type agitator is in the form of a jet nozzle extending at right angles to the axis of the frame and spaced from the inlet of the first pump means and said conduit means communicating the first pump means with the first nozzle type agitator such that the discharge of the first pump means may be alternated to feed one of the delivery means and the first nozzle type agitator.

16. An apparatus as defined in claim 15, wherein adjustment means are provided for moving the direction of the jet nozzle of the first nozzle type agitator means through a plane passing through the axis of the frame and separate means for adjusting the direction of said jet nozzle of the first nozzle type agitator means through an arc in a plane at right angles to the axis of the frame.

* * * * *